United States Patent
Sami et al.

(10) Patent No.: US 6,662,569 B2
(45) Date of Patent: Dec. 16, 2003

(54) METHOD AND APPARATUS FOR USING MAGNETIC FIELDS FOR ENHANCING HEAT PUMP AND REFRIGERATION EQUIPMENT PERFORMANCE

(76) Inventors: Samuel M. Sami, 68 Sir Lancelot Drive, Moncton, New Brunswick (CA), E1A 6N6; Peter A. Kulish, 110 S. Sugan Rd., New Hope, PA (US) 16938; Ronald J. Kita, 67 Shady Spring Dr., Doylestown, PA (US) 18901; Garrett J. Shivo, 48 Beaver La., Warren, VT (US) 05674

(*) Notice: Subject to any disclaimer, the term of this patent is extended or adjusted under 35 U.S.C. 154(b) by 0 days.

(21) Appl. No.: 10/264,992

(22) Filed: Oct. 4, 2002

(65) Prior Publication Data

US 2003/0182946 A1 Oct. 2, 2003

Related U.S. Application Data

(60) Provisional application No. 60/368,077, filed on Mar. 27, 2002.

(51) Int. Cl.[7] .............................. F25B 21/00; F25B 1/00
(52) U.S. Cl. ................. 62/3.1; 62/498; 62/115
(58) Field of Search .................. 62/7.1, 498, 467, 62/115

(56) References Cited

U.S. PATENT DOCUMENTS

| | | | | |
|---|---|---|---|---|
| 2,566,192 A | * | 8/1951 | Grooms | 62/204 |
| 5,024,059 A | * | 6/1991 | Noble | 62/3.1 |
| 5,165,242 A | * | 11/1992 | Chang | 62/3.1 |
| 5,177,970 A | * | 1/1993 | Chang | 62/3.1 |
| 5,259,213 A | * | 11/1993 | Phillippe | 62/324.1 |
| 6,183,206 B1 | * | 2/2001 | Valenzuela et al. | 417/50 |
| 6,250,087 B1 | * | 6/2001 | Owada et al. | 62/62 |
| 6,332,331 B1 | * | 12/2001 | Cheng et al. | 62/275 |
| 2002/0179536 A1 | * | 12/2002 | Lee | 210/695 |

FOREIGN PATENT DOCUMENTS

JP  11-311460  * 9/1999

* cited by examiner

Primary Examiner—William C. Doerrler
(74) Attorney, Agent, or Firm—Stephen H. Eland; Dann, Dorfman, Herrell and Skillman

(57) ABSTRACT

A vapor compression apparatus and a method for operating a vapor compression system are provided. A working fluid is conveyed through a vapor compression system having a fluid line. A magnetic field generator is connected to the fluid line to direct a magnetic field through the working fluid. The magnetic field is operable to disrupt intermolecular forces and weaken intermolecular attraction to enhance expansion of the working fluid to the vapor phase, increasing the capacity, performance and efficiency of the system components, and reducing system cycling, mechanical wear and energy consumption.

55 Claims, 3 Drawing Sheets

METHOD AND APPARATUS FOR USING MAGNETIC FIELDS FOR ENHANCING HEAT PUMP AND REFRIGERATION EQUIPMENT PERFORMANCE

RELATED APPLICATIONS

This application claims priority under 35 U.S.C. §119 to U.S. provisional application No. 60/368,077 filed Mar. 27, 2002, which is hereby incorporated herein by reference.

FIELD OF THE INVENTION

The present invention relates to vapor compression systems, and more specifically to a vapor compression apparatus with magnetic components, and a method for enhancing the performance of heat pump and refrigeration equipment and the efficiency of vapor compression systems.

BACKGROUND

In the present state of the art, vapor compression systems are used in a number of applications to cool an environment. Vapor compression is used in air conditioners, refrigerators, freezers, blast freezers and other cooling systems. Cooling is achieved by evaporating a refrigerant or refrigeration media under reduced pressure to lower the temperature of the refrigerant and absorb heat from an environment.

In conventional vapor compression systems, refrigerants or refrigerant mixtures with low boiling points are used as the working fluid. The refrigerant is pumped to a compressor which elevates the temperature and pressure of the refrigerant. The hot refrigerant is discharged to a first heat exchanger, or condenser, to remove heat from the refrigerant. As heat is removed in the condenser at elevated pressure, the refrigerant converts to the liquid phase. The refrigerant is then conveyed to an expansion valve that rapidly reduces the pressure of the refrigerant. The rapid pressure reduction causes the refrigerant to flash into a liquid and vapor mixture having a very low temperature. The refrigerant is discharged to a second heat exchanger, or evaporator, where the refrigerant absorbs heat. The added heat converts a substantial portion of the remaining liquid phase to the vapor phase. The refrigerant is cycled back to the compressor, where the foregoing process is repeated.

A significant problem with present vapor compression systems is the excessive cost of operation. Vapor compression consumes a significant amount of energy. Energy efficiency in vapor compression systems is often limited by incomplete or inefficient evaporation and condensation of the refrigerant. When evaporation is incomplete, some of the refrigerant enters the compressor shell in the liquid phase. The compressor must consume additional energy to boil the liquid refrigerant that enters the compressor shell. This reduces the coefficient of performance (COP) of system components and overall efficiency of the system.

SUMMARY OF THE INVENTION

In a first aspect of the present invention, a vapor compression apparatus is provided that efficiently evaporates a working fluid to cool an environment. The working fluid is conveyed through a fluid line and passed through a compressor, a condenser, an expansion valve and an evaporator. One or more magnets are connected to the fluid line to generate a magnetic field through the working fluid. The magnetic field disrupts intermolecular forces in the working fluid and permits molecules in the liquid phase to disperse. The expanded molecules are more easily converted to the vapor phase, providing for more efficient evaporation. The apparatus is intended for use with various working fluids, and operable under various ranges of boiling and condensation temperatures to cover applications including, but not limited to, refrigeration, air conditioning, heat pumping and blast freezing.

The present invention may be constructed and operated without the need for a highly skilled technician. In operation, the present invention increases the cooling capacity and COP of the evaporator. The present invention also reduces the amount of liquid fluid that enters the compressor shell, decreasing the power consumption by the compressor and reducing wear on compressor parts. In addition, the present invention improves system performance to reduce system cycling and limit wear on the condenser, evaporator and other components. The enhanced performance of the system and reduced cycling lowers overall power consumption in the system, conserving energy and lowering greenhouse gas emissions to the environment.

In a second aspect of the present invention, a method for operating a vapor compression system is provided. As described above, a magnetic field is applied to a working fluid in a vapor compression system to disrupt intermolecular forces in the working fluid. The magnetic field is applied to the fluid before the fluid is conveyed through an expansion valve to enhance vaporization of the fluid.

DESCRIPTION OF THE DRAWINGS

The foregoing summary as well as the following description will be better understood when read in conjunction with the figures in which.

DETAILED DESCRIPTION OF THE PREFERRED EMBODIMENT

Figure 1:
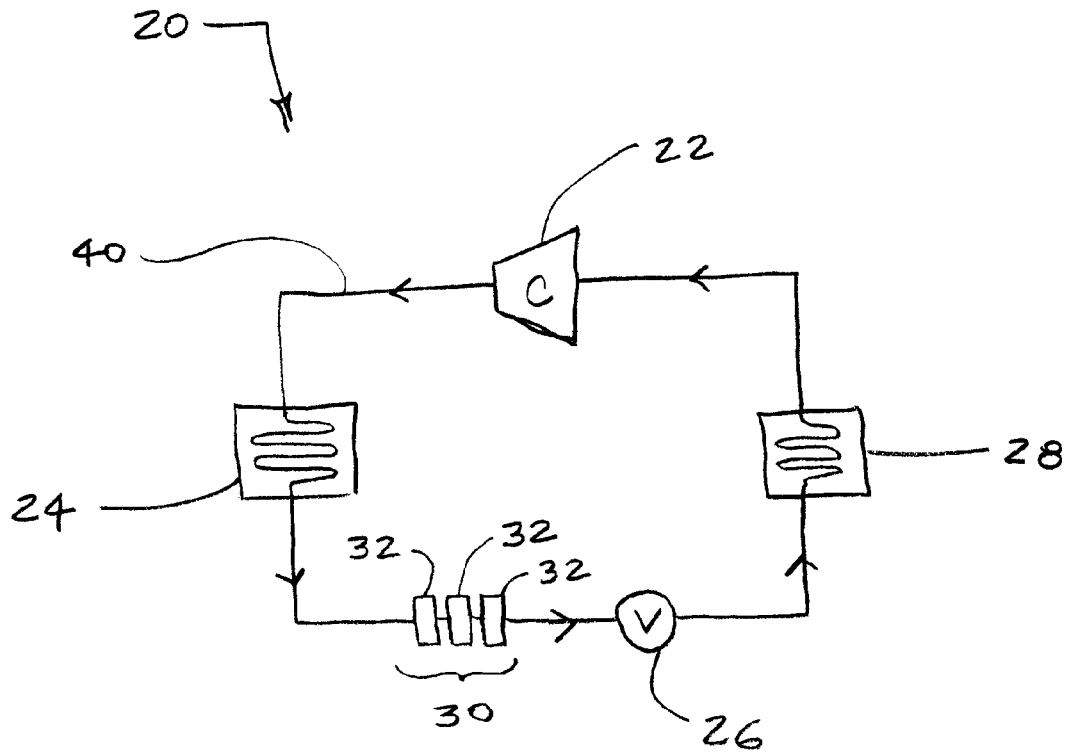
FIG. 1 is a schematic view of an apparatus in accordance with the present invention.
Figure 2:
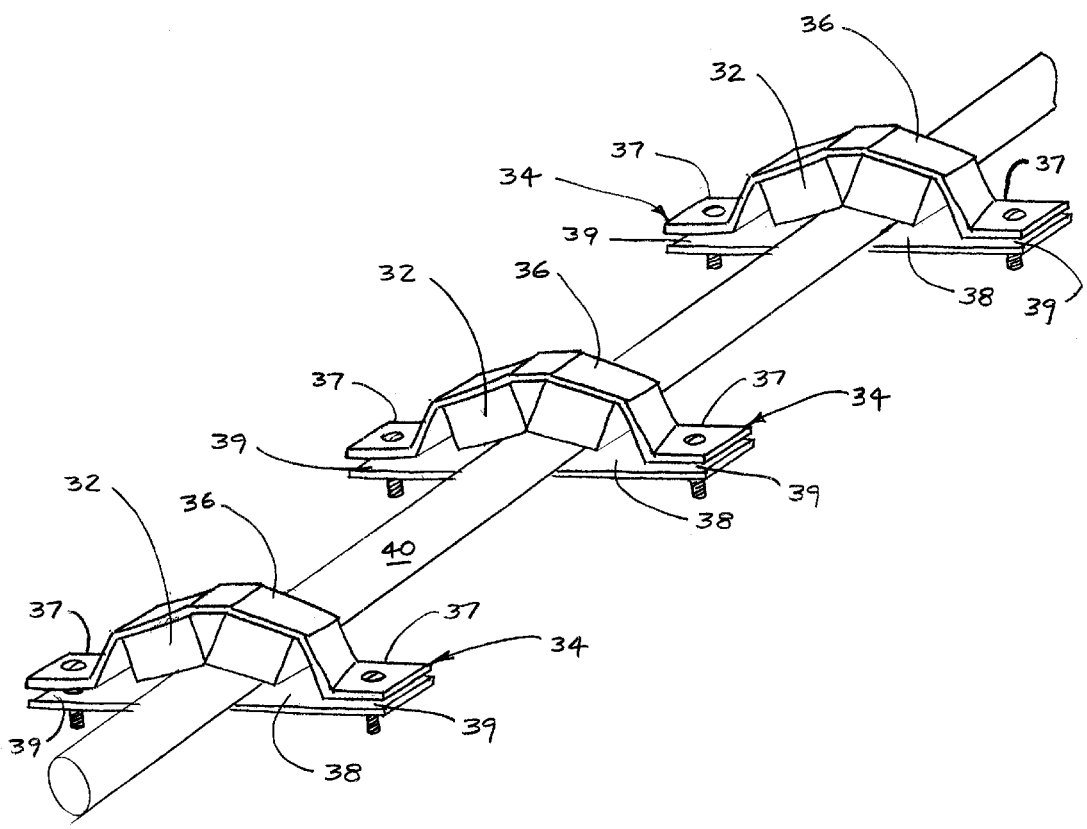
FIG. 2 is a fragmented perspective view of an apparatus in accordance with the present invention, illustrating one possible arrangement of magnets connected to a fluid line.
Figure 3:
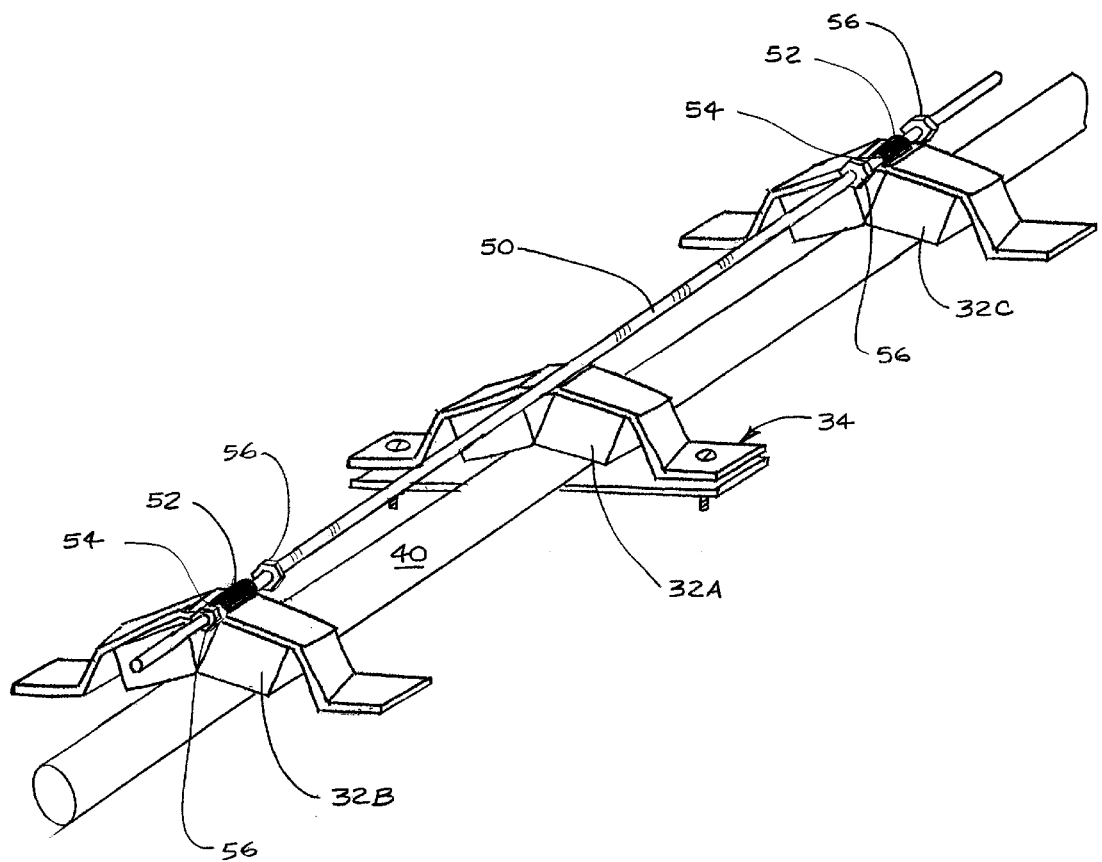
FIG. 3 is a fragmented perspective view of an apparatus in accordance with the present invention, showing an alternate arrangement of magnets on the fluid line.

Referring to FIGS. 1–3 in general, and to FIG. 1 specifically, a schematic view of a vapor compression system in accordance with the present invention is shown and designated generally as 20. The system 20 is operable to condense and evaporate a working fluid which flows through the system. A magnetic field is generated through the working fluid to enhance the coefficient of performance and energy efficiency of the system 20.

The vapor compression system 20 comprises a compressor 22, a condenser 24, an expansion valve 26 and an evaporator 28. Depending on operating conditions, the system 20 may also incorporate other components used in vapor compression, including but not limited to a pre-condenser, post-condenser, pre-evaporator, post-evaporator, reversing valve, suction accumulator, and other components. The system 20 may use any type of heat exchanger in the condenser 24 and evaporator 28, including but not limited to refrigerant/air, refrigerant/water or refrigerant/anti-freeze exchangers.

A magnetic device 30 is connected to the system to create a magnetic field through the working fluid. The magnetic field is applied to the working fluid in the liquid phase to disrupt intermolecular forces in the working fluid and enhance expansion of the working fluid molecules. This reduces the amount of residual liquid that is boiled in the compressor shell, lowering the power consumption of the compressor and improving the overall efficiency of the system. The direction of flow of the working fluid in the system 20 is represented by the arrows in FIG. 1.

The system 20 is intended to enhance the performance of a number of working fluids in vapor compression systems, including but not limited to pure refrigerants and multi-component HFC mixtures. The type of working fluid is dependent on, among other things, the desired application and operating temperatures for the condenser and evaporator. The present invention has been found to enhance performance of working fluids at condenser temperatures between 20° C. and 90° C., and evaporator temperatures between −85° C. and 25° C. The system 20 may be used with any pure refrigerant or refrigerant mixture, including but not limited to R-12, R-22, R-502, R-11, R-114, R-134*a*, R-507 (R-125/R-143*a*:50/50%), R-404A (R-125/R-143*a*/R-134*a*:44/52/4%), R-410A (R-32/R-125:50/50%), and R-407C (R-32/R-125/R-134*a*:23/25/52%). In addition, ammonia, methane, ethane, propane, butane, pentane and carbon dioxide may be used as working fluids in the present invention. The foregoing list of refrigerants represents just some of the possible refrigerants that may be used, and is not intended to be exhaustive or exclude other refrigerants not explicitly mentioned. In the description that follows, the system 20 will be described simply as using a refrigerant, with the understanding that this may include a variety of pure refrigerants, multi-component HFC refrigerant mixtures, and other working fluids suitable for different applications.

It has been found that magnetic enhancement of refrigeration media has performed best with multi-component HFC refrigerant mixtures, which are preferred in the present invention. Ternary refrigerant mixtures are most preferred. However, binary mixtures and pure refrigerants such as R-134A may also be used. Significant improvements in system performance have been found when magnetic enhancement is applied to systems using the R-404A and R-410A refrigerant mixtures. In particular, significant improvement in evaporator capacity has been observed when magnetic enhancement is used with R-404A. Significant improvement in condenser capacity has been observed when magnetic enhancement is used with R-410A.

Referring now to FIGS. 1–2, the system 20 will be described in greater detail. The system 20 is a closed loop system, in which the refrigerant is recycled. A fluid line 40 connects the compressor 22, condenser 24, expansion valve 26 and evaporator 28 in the closed loop. The magnetic device 30 comprises one or more magnets 32 that are held proximate to the fluid line 40. The magnets 32 may be either permanent magnets or electromagnets. Various arrangements of magnets 32 may be used to generate a magnetic field through the fluid line 40. For example, the magnets 32 may be made up of single-type or double-type magnets. In addition, the magnets 32 may have a unipolar or dipolar arrangement with respect to the fluid line 40.

The magnets 32 may be held in contact with the fluid line 40 using any type of connector or conduit arrangement. For example, the magnets may be secured to the fluid line 40 by a clamp that connects around the fluid line. Alternatively, the magnets 32 may be enclosed around a short section of conduit that is configured to be connected in line with the fluid conduit 40 using couplings, fittings or other technique. Although it is preferable to connect the magnetic device 30 to the fluid line 40 so that it directly contacts the fluid line, there may be a gap between the magnetic device and the fluid line. The magnetic device 30 simply must be sufficiently proximate the fluid line 40 to allow the magnetic field produced from the magnets to affect the working fluid.

In FIG. 2, three magnets 32 are shown connected to fluid line 40. Each magnet 32 is connected to the fluid line 40 with a clamp 34. Each clamp 34 comprises a pair of plates that are connected together around the fluid line and a magnet. The plates hold the magnet in direct contact with the exterior of the fluid line. More specifically, the clamp 34 comprises a first plate 36 having a generally curved shape that fits around a magnet 32 and one side of the fluid line 40, as shown in FIG. 2. The clamp 34 also comprises a generally flat second plate 38 placed on an opposite side of the fluid line 40. The first plate 36 has a pair of outwardly extending flanges 37 that are configured to cooperate with a pair of ends 39 on the second plate 38. The flanges 37 on first plate 36 and the ends 39 on the second plate 38 have bores that align with one another when the plates are placed around the fluid line 40. The plates 36, 38 are held together in tight engagement by screws inserted through the bores as the bores are aligned. In this way, the plates 36,38 are configured to hold the magnet 32 securely against the exterior of the fluid line 40. As stated earlier, the magnets may be arranged in a number of configurations relative to the fluid line 40. The foregoing description and reference to FIG. 2 illustrates just one of the many arrangements that may be used in the present invention. For example, two curved plates similar to the first plates 36 in FIG. 2 may be clamped together around the fluid line 40 so that magnets are disposed on both sides of the fluid line.

Evaporation of the refrigerant is enhanced by the application of an external magnetic field through the refrigerant in the liquid phase. Magnetic field energy has been found to alter the polarity of refrigerant molecules and disrupt intermolecular Van der Waals dispersion forces between refrigerant molecules. When the liquefied refrigerant is converted to vapor, intermolecular attraction caused by dipole interaction and Van der Waals forces must be overcome. The magnetic field affects the intermolecular attractions between neighboring molecules to permit the molecules to expand. More specifically, it is believed that the magnetic field weakens the intermolecular attraction between molecules in the refrigerant thereby allowing the molecules to expand more readily. This lowers the amount of energy required to drive the molecules apart, resulting in enhanced vaporization of the fluid.

Magnetic fields are preferably applied to the refrigerant prior to flowing through the expansion valve 26. In FIG. 1, the magnets 32 are shown connected to the fluid line 40 between the outlet of the condenser and the inlet of the expansion valve 26. The magnets are positioned on the fluid line 40 so as to apply a magnetic field through a full liquid line before the fluid passes through the expansion valve 26. The precise location where the refrigerant achieves a full liquid state after the condenser varies depending on the refrigerant, the size of the fluid line and operating conditions. Preferably, the magnets 32 are placed at a distance from the condenser outlet of between 20D and 120D, where D represents the outside diameter of the fluid line. Working fluids will typically be fully condensed in the liquid phase at this distance from the condenser outlet. The fluid line 40 between the condenser outlet and expansion valve inlet preferably has no fittings or transitions that could trap gas or interfere with condensation of the refrigerant. The line between the condenser outlet and expansion valve inlet may be vertical to assure that the fluid line passing through the magnetic field carries a full liquid flow without any trapped gas.

As stated earlier, the magnets 32 may be either single-type or double-type magnets. Referring to FIG. 2, single-type magnets 32 are shown held against the fluid line 40 such that the polarity of each magnet is directed orthogonally to the flow direction in the fluid line; however, the polarity of magnets may be changed and still achieve acceptable results. The required number and arrangement of magnets will vary depending on operating conditions, including but not limited to the length of fluid line available to connect the magnets. A number of arrangements may be used in the present invention. For example, the present invention may utilize one relatively long magnet of low intensity, or a series of smaller magnets each having a larger intensity. Magnets 32 should each have a magnetic strength no less than 300 gauss. It has been found that enhancement of thermal capacities and COP of the system 20 increases as gauss levels are increased. Therefore, the magnetic strength of each magnet 32 is preferably no less than 2000 gauss, and more preferably no less than 4000 gauss. It has been found that three 4000 gauss magnets enhance vaporization of a refrigerant in a cooling system using a ⅜" diameter conduit for the refrigerant. However, vaporization enhancement will also be achieved with other magnet intensities and conduit diameters. The magnets 32 may be formed of any suitable material or combination of materials, including but not limited to ferrites embedded in polymers.

The magnets 32 may be clamped individually to the fluid line 40, as described earlier. Alternatively, the magnets 32 may be interconnected and mounted to the fluid line 40 as an assembly. Referring to FIG. 3, magnets 32A, 32B and 32C are interconnected on a threaded rod 50 and held in contact with fluid line 40. The threaded rod 50 permits fine adjustment of the spacing between magnets on the fluid line 40 to alter the magnetic field characteristics. Magnet 32A is anchored to the fluid line 40 in a fixed position by a clamp 34. The threaded rod 50 is connected to the clamp 34 so that it is fixed relative to magnet 32A. The rod 50 may be welded to the clamp 34 or inserted through a sleeve having threads that mate with the threads on the rod. Once magnet 32A is clamped on the fluid line 40, the rod 50 is configured to hold additional magnets in contact with the fluid line.

In FIG. 3, magnets 32B and 32C are placed on the rod 50 on each side of magnet 32A. Magnets 32B and 32C are each connected on the rod 50 by a sleeve 52. Each sleeve 52 has a bore 54 adapted to receive the rod and permit the magnets to slide along the length of the rod. A pair of locknuts 56 are threaded onto the rod on each side of the sleeves on magnets 32B and 32C. When threaded on the rod, the locknuts 56 are axially displaceable on the rod by rotating the locknuts. The locknuts engage the sleeves to limit displacement of magnets 32B and 32C relative to the fluid line 40. More specifically, the locknuts 56 are configured to be tightened against the sleeves 52 to retain the magnets 32B and 32C in fixed positions relative to the fluid line 40 and magnet 32A. The magnets 32B and 32C are movable on the rod 50 when the locknuts are rotated out of engagement and away from the sleeves to provide clearance for the magnets to be moved on the rod. As such, the locknuts are configured to hold the magnets 32B and 32C in a fixed position on the rod 50, and operable to increase or decrease the spacing between the magnets.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. Accordingly, the invention incorporates variations that fall within the scope of the following claims.

We claim:

1. A vapor compression apparatus for use with a working fluid, comprising:
    A. a compressor operable to increase the pressure and temperature of the working fluid;
    B. a condenser operable to absorb heat from the working fluid;
    C. an expansion valve operable to decrease the pressure of the working fluid;
    D. an evaporator operable to transfer heat to the working fluid; and
    E. a magnetic element, operable to generate a magnetic field through the working fluid, wherein the magnetic field has sufficient magnitude to disrupt intermolecular forces in the working fluid.

2. The apparatus of claim 1, wherein the condenser comprises a heat exchange medium comprising one of air, water and anti freeze.

3. The apparatus of claim 1, wherein the evaporator comprises a heat exchange medium comprising one of air, water and anti freeze.

4. The apparatus of claim 1, wherein the working fluid comprises a refrigerant.

5. The apparatus of claim 4, wherein the refrigerant comprises a multi-component HFC mixture.

6. The apparatus of claim 5, wherein the HFC mixture comprises one of R-12, R-22, R-502, R-11, R-114, R-134*a*, R-507 (R-125/R-143*a*:50/50%), R-404A (R-125/R-143*a*/R-134*a*:44/52/4%), R-410A (R-32/R-125:50/50%), and R-407C (R-32/R-125/R-134*a*:23/25/52%).

7. The apparatus of claim 1, wherein the working fluid comprises one of ammonia, methane, ethane, propane, butane, pentane and carbon dioxide.

8. The apparatus of claim 1, further comprising a reversing valve where refrigerant flow direction can be reversed for heating and cooling applications.

9. The apparatus of claim 1, comprising a fluid line between the condenser and the expansion valve, wherein the magnetic element is disposed proximate the fluid line to apply a magnetic field through the fluid line between the condenser and before the expansion valve.

10. The apparatus of claim 9 wherein the fluid line comprises a generally vertical conduit configured to convey the working fluid from the condenser to the expansion valve.

11. The apparatus of claim 1, comprising a fluid line through which the working fluid operates wherein the magnetic element is connected to the fluid line.

12. The apparatus of claim 11, wherein the magnetic element comprises a plurality of magnets connected to the fluid line.

13. The apparatus of claim 11, wherein the magnetic element is connected to the fluid line so as to permit slidable displacement of the magnetic element with respect to fluid line.

14. The apparatus of claim 1, wherein the magnetic element has a strength of at least 300 gauss.

15. The apparatus of claim 14 wherein the magnetic element has a strength of at least 2000 gauss.

16. The apparatus of claim 14 wherein the magnetic element has a strength of at least 4000 gauss.

17. A method for enhancing the performance of a working fluid in a vapor compression system, said method comprising the steps of:

A. compressing the working fluid to elevate the pressure and temperature of the working fluid;

B. discharging the working fluid to a condenser to release heat from the working fluid and convert the fluid to a liquid phase;

C. discharging the working fluid from the condenser to an expansion device to convert the working fluid to a vapor phase;

D. applying a magnetic field to the working fluid; and

E. discharging the working fluid from the expansion device and transferring heat to the working fluid.

18. The method of claim 17 wherein the step of applying a magnetic field comprises applying a magnetic field to the working fluid between the step of compressing the working fluid and the step of discharging the working fluid to an expansion device prior to where the fluid enters the expansion device.

19. The method of claim 17 wherein the working fluid flows through a conduit, and the step of applying a magnetic field comprises applying the magnetic field through the conduit.

20. The method of claim 17 wherein the step of applying a magnetic field comprises connecting a magnet to a pipe between an outlet on the condenser and an inlet on the expansion device.

21. The method of claim 20 wherein the step of applying a magnetic field comprises connecting the magnet to the pipe at a distance from the condenser outlet of about 20D–120D, where D is equal to the outer diameter of the pipe.

22. The method of claim 17 wherein the working fluid has a temperature at the condenser between 20° C. and 90° C.

23. The method of claim 17 wherein the working fluid has a temperature at the evaporator between −85° C. and 25° C.

24. A vapor compression apparatus for use with a working fluid, comprising:

A. a compressor operable to increase the pressure and temperature of the working fluid;

B. a condenser operable to absorb heat from the working fluid;

C. an expansion valve operable to decrease the pressure of the working fluid;

D. an evaporator operable to transfer heat to the working fluid; and

E. a magnetic element, operable to generate a magnetic field through the working fluid; and F. a fluid line between the condenser and the expansion valve, wherein the magnetic element is disposed proximate the fluid line to apply a magnetic field through the fluid line between the condenser and before the expansion valve.

25. The apparatus of claim 24, wherein the condenser comprises a heat exchange medium comprising one of air, water and anti freeze.

26. The apparatus of claim 24, wherein the evaporator comprises a heat exchange medium comprising one of air, water and anti freeze.

27. The apparatus of claim 24, wherein the working fluid comprises a refrigerant.

28. The apparatus of claim 27, wherein the refrigerant comprises a multi-component HFC mixture.

29. The apparatus of claim 28, wherein the HFC mixture comprises one of R-12, R-22, R-502, R-11, R-114, R-134a, R-507 (R-125/R-143a:50/50%), R-404A (R-125/R-143a/R-134a:44/52/4%), R-410A (R-32/R-125:50/50%), and R-407C (R-32/R-125/R-134a:23/25/52%).

30. The apparatus of claim 24, wherein the working fluid comprises one of ammonia, methane, ethane, propane, butane, pentane and carbon dioxide.

31. The apparatus of claim 24, further comprising a reversing valve where refrigerant flow direction can be reversed for heating and cooling applications.

32. The apparatus of claim 24, wherein the magnetic field has sufficient magnitude to disrupt intermolecular forces in the working fluid.

33. The apparatus of claim 24 wherein the fluid line comprises a generally vertical conduit configured to convey the working fluid from the condenser to the expansion valve.

34. The apparatus of claim 24, wherein the magnetic element is connected to the fluid line.

35. The apparatus of claim 34, wherein the magnetic element comprises a plurality of magnets connected to the fluid line.

36. The apparatus of claim 34, wherein the magnetic element is connected to the fluid line so as to permit slidable displacement of the magnetic element with respect to fluid line.

37. The apparatus of claim 24, wherein the magnetic element has a strength of at least 300 gauss.

38. The apparatus of claim 37 wherein the magnetic element has a strength of at least 2000 gauss.

39. The apparatus of claim 37 wherein the magnetic element has a strength of at least 4000 gauss.

40. A vapor compression apparatus for use with a working fluid, comprising:

A. a compressor operable to increase the pressure and temperature of the working fluid;

B. a condenser operable to absorb heat from the working fluid;

C. an expansion valve operable to decrease the pressure of the working fluid;

D. an evaporator operable to transfer heat to the working fluid; and

E. a magnetic element, operable to generate a magnetic field through the working fluid; and F. a fluid line through which the working fluid operates wherein the magnetic element is connected to the fluid line.

41. The apparatus of claim 40, wherein the condenser comprises a heat exchange medium comprising one of air, water and anti freeze.

42. The apparatus of claim 40, wherein the evaporator comprises a heat exchange medium comprising one of air, water and anti freeze.

43. The apparatus of claim 40, wherein the working fluid comprises a refrigerant.

44. The apparatus of claim 43, wherein the refrigerant comprises a multi-component HFC mixture.

45. The apparatus of claim 44, wherein the HFC mixture comprises one of R-12, R-22, R-502, R-11, R-114, R-134a, R-507 (R-125/R-143a:50/50%), R-404A (R-125/R-143a/R-134a:44/52/4%), R-410A (R-32/R-125:50/50%), and R-407C (R-32/R-125/R-134a:23/25/52%).

46. The apparatus of claim 40, wherein the working fluid comprises one of ammonia, methane, ethane, propane, butane, pentane and carbon dioxide.

47. The apparatus of claim 40, further comprising a reversing valve where refrigerant flow direction can be reversed for heating and cooling applications.

48. The apparatus of claim 40, wherein the magnetic field has sufficient magnitude to disrupt intermolecular forces in the working fluid.

49. The apparatus of claim 40, wherein the fluid line extends between the condenser and the expansion valve and the magnetic element is connected to the fluid line between the condenser and the expansion valve to apply a magnetic field through the fluid line between the condenser and before the expansion valve.

50. The apparatus of claim 49 wherein the fluid line comprises a generally vertical conduit configured to convey the working fluid from the condenser to the expansion valve.

51. The apparatus of claim 41, wherein the magnetic element comprises a plurality of magnets connected to the fluid line.

52. The apparatus of claim 40, wherein the magnetic element is connected to the fluid line so as to permit slidable displacement of the magnetic element with respect to fluid line.

53. The apparatus of claim 40, wherein the magnetic element has a strength of at least 300 gauss.

54. The apparatus of claim 53 wherein the magnetic element has a strength of at least 2000 gauss.

55. The apparatus of claim 53 wherein the magnetic element has a strength of at least 4000 gauss.

* * * * *